United States Patent [19]

Langston

[11] Patent Number: 5,029,816
[45] Date of Patent: Jul. 9, 1991

[54] LOW FRICTION PULLING OF FIBER OPTIC CABLE IN CONDUIT

[76] Inventor: Raoph C. Langston, 13588 SE. 152nd Ave., Clackamas, Oreg. 97015

[21] Appl. No.: 411,379

[22] Filed: Sep. 22, 1989

Related U.S. Application Data

[60] Continuation-in-part of Ser. No. 220,699, Jul. 18, 1988, Pat. No. 4,875,661, which is a continuation-in-part of Ser. No. 56,490, Jun. 1, 1987, Pat. No. 4,757,976, which is a continuation-in-part of Ser. No. 818,117, Jan. 10, 1986, Pat. No. 4,669,705, Division of Ser. No. 648,757, Sep. 7, 1984, Pat. No. 4,576,362.

[51] Int. Cl.$^5$ ............................................. H02G 1/08
[52] U.S. Cl. ......................................... 254/134.3 FT
[58] Field of Search ............ 254/134.3 FT, 134.3 PA, 254/134.3 R; 242/86.5, 86.7

[56] References Cited

U.S. PATENT DOCUMENTS

| | | | |
|---|---|---|---|
| 2,750,152 | 6/1956 | Schinske | 254/134.3 FT |
| 3,102,715 | 9/1963 | Weitzel et al. | 254/134.3 FT |
| 4,411,409 | 10/1983 | Smith | 254/134.3 FT |
| 4,609,181 | 9/1986 | Fisher et al. | 254/134.3 FT |

OTHER PUBLICATIONS

Textile World, Jan. 1975, "How to Weave High-Tensill Webbings", pp. 109–111.

*Primary Examiner*—Robert C. Watson
*Attorney, Agent, or Firm*—Marger, Johnson, McCollom & Stolowitz, Inc.

[57] ABSTRACT

A fiber optic cable pulling method uses a series of large-diameter capstan winches placed at intermediate access points along the conduit through which multiple runs of fiber optic cable is to be pulled. Each capstan winch simultaneously pulls a portion of each of the cables through a segment of the conduit at a substantially uniform velocity and tension. The capstan wheel of each winch is sized frictionally to engage the cables without exceeding its minimum bending radius. The cables simultaneously wind around each capstan wheel. The winches are independently controlled to maintain pulling tension on each portion of the cable below a predetermined tension which, if exceeded, could damage the fiber optics in the cable. The capstan winches are spaced sufficiently close together to pull a portion of the cables in parallel through each conduit segment of a tension ordinarily less than the maximum tension porvided by the capstant winches. If a portion of the cable catches in a segment of conduit, the winches cease pulling along the entire length of the cable. The cables are pulled from a common pull rope and the speeds of the intermediate winches are set relative to an end winch and one another so that the cables slip slightly on the capstant wheels to continuously apply substantially equal tensions to the cables in each segment.

6 Claims, 6 Drawing Sheets

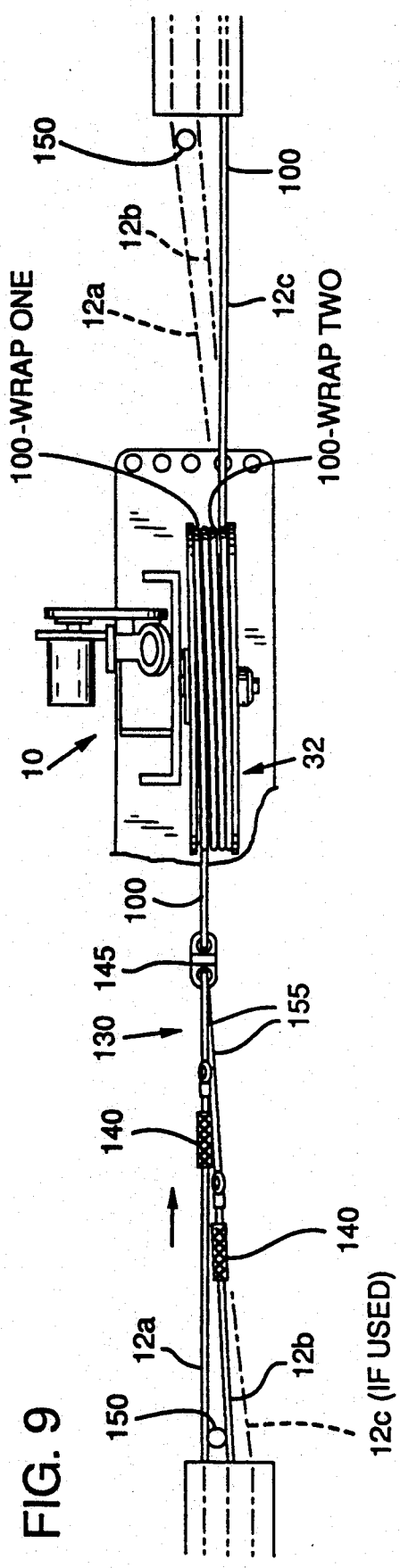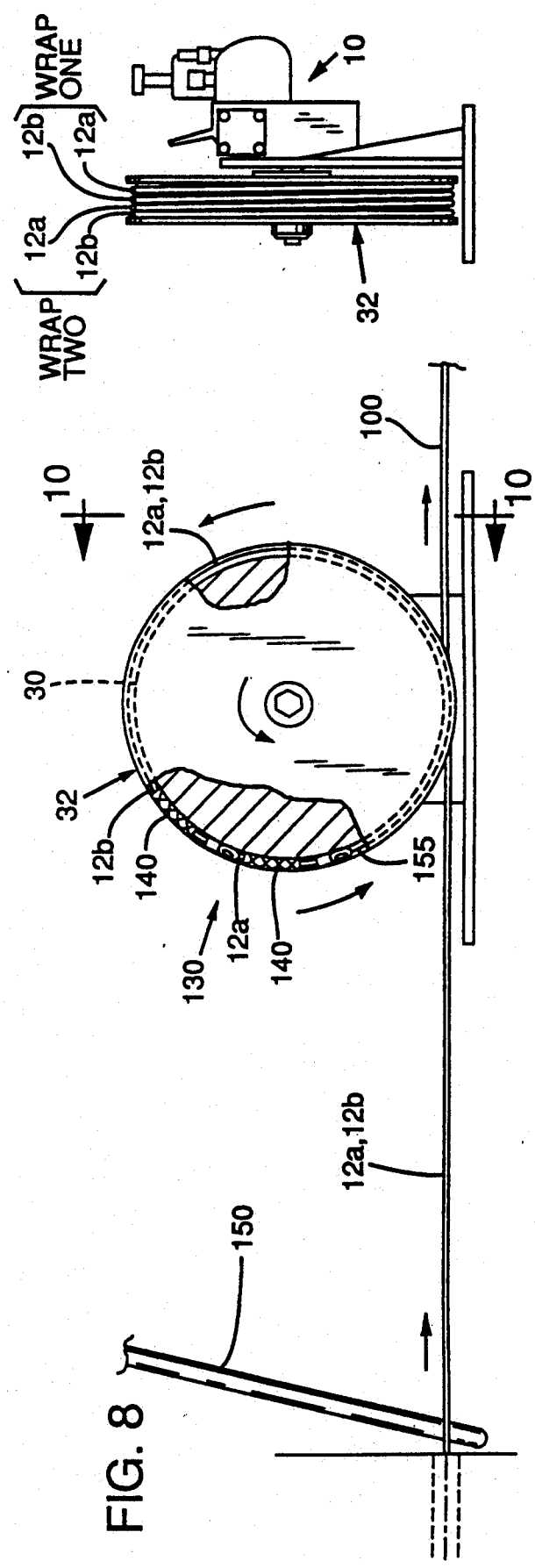

LOW FRICTION PULLING OF FIBER OPTIC CABLE IN CONDUIT

This application is a continuation-in-part of my copending application Ser. No. 07/220,699, filed, July 18, 1988, now U.S. Pat. No. (4,875,661), issued (Oct. 24, 1989), which is a continuation-in-part of my copending application Ser. No. 07/056,490, filed June 1, 1987, now U.S. Pat. No. 4,757,976, issued July 19, 1988, Which is a continuation-in-part of my prior application Ser. No. 06/818,117, filed Jan. 10, 1986, now U.S. Pat. No. 4,669,705, issued June 2, 1987; which is a divisional of prior application Ser. No. 06/648,757, filed Sept. 7, 1984, now U.S. Pat. No. 4,576,362, issued Mar. 18, 1986.

BACKGROUND OF THE INVENTION

This invention relates to method and apparatus for pulling wire cables and fiber optic cables through underground conduit, and more particularly to pull ropes for pulling such cables.

Fiber optic cable is composed of a bundle of long, thin fibers of glass, plastic or other transparent material, closed within a protective sheath. Encoded light pulses carrying audio and video signals are sent through the fiber much like electric current travels along a wire. The advantage of fiber optic cable over conventional cable lies in its transmission characteristics. Because of the fiber's thinness and superior attenuation characteristics, a fiber optic cable can carry a much higher rate of information over many more channels than a comparably sized wire cable.

However, fiber optic cable is more difficult to lay than conventional cable. It lacks the tensional strength of conventional wire cable and will fracture at a much lower pulling tension. Furthermore, because of its construction, fiber optic cable is relatively inflexible. Typically, the fibers are bundled in a spiral fashion around a stiff steel support wire within a hard plastic protective sheath. Bending of the cable beyond a limited range can break the fibers within.

Because of these material drawbacks, conventional pulling methods and apparatus have proven inadequate for pulling more than a relatively short length of fiber optic cable through an underground conduit. These methods usually comprise placing a single winch at the conduit exit, passing a pull rope attached to the fiber optic cable through the conduit to the winch, and operating the winch to pull the rope and cable through the conduit until the rope is completely wound on the winch and the cable reaches the conduit exit. Pulling a cable in such a manner requires considerable tension to overcome the frictional drag of the cable and pull rope along the conduit surface. The winch pulling tension necessary to overcome this drag quickly increases as the length of pull increases. Lubricant is conventionally used to reduce drag but does not solve the problem. Typically, no more than 2,000 feet of cable can be pulled before the winch tension exceeds the cable's tensional limit. (However, the length of pull varies with the condition of the conduit.) In contrast, many times that length of wire cable can be pulled without the cable breaking.

The extra pulling requires more time and manpower in moving the winches and setting up the apparatus. Moreover, connecting the relatively short lengths of fiber optic cable adds substantial additional cost to installation of the cable. Each connection demands expensive and time-consuming splicing. The extra splicing in turn creates resistance to the transmitted light pulses which must be overcome by the installation of additional signal repeaters along the cable to boost the signal strength.

To increase the maximum continuous length of fiber optic cable which may be pulled, several techniques have been developed. My own prior invention of a intermediate capstan winch system and pulling method, described in my above-cited patents has proven to be the most effective over nearly five years of use. Nevertheless, improvements remain to be made.

Typically, pulling cable through conduit by conventional means begins by connecting the cable to be pulled to a pull rope that has previously been placed in a conduit. The preferred method for installing the pull rope is to blow it in to the conduit pneumatically. The pull rope is then connected to the cable at the entry end of the conduit and is pulled toward the exit end of the conduit by a winch located at the exit end. Usually, the cable comes wound on a spool, and as the cable is pulled through the entry end of the conduit, the cable unwinds from the spool.

Frequently, conduit for cable is placed in the same passageway along with other underground utilities through a network of manholes. Because space for these utilities is limited, conduit must often be routed around other utilities by curving and twisting the conduit. Moreover, conduit must sometimes be installed in places where it is necessary to turn at 90 degree angles, e.g., when cables are routed into buildings from underground manholes.

Each place where the conduit bends, the outer surfaces of the pull rope and cable chafe against the inside of the conduit as each are pulled through the conduit. As a result, friction and resistance are generated. In addition, even in straight conduit, there can be substantial resistance and friction between the pull rope or cable against the conduit.

As a result of friction and resistance, tension is created in the pull rope. Since friction occurs over the whole length of pull rope, the largest tensile forces will occur at the most downstream portion of the conduit, i.e., at the exit end of the conduit. Consequently, this causes the highest levels of abrasion, on the conduit and on the rope, to occur toward the exit end of the conduit, on long pulls of cable.

Since lengths of conduit are commonly 2000 feet and longer, and the length of pull rope in successive segments of conduit is sometimes longer than 10,000 feet, extensive friction by the pull rope against the conduit is generated. Accordingly, the friction generated by longer pulls can cause extensive abrasion of the pull rope, the conduit, and the cable.

In addition, the amount stretch in the pull rope is another factor that a cable installer must consider. As the length of pull becomes longer and the tensile forces become greater, the pull rope will be subject to a large amount of stretch. The additional amount of stretch in longer pulls may become critical thus limiting the maximum length of pull.

In light of the foregoing, there is an established need for low friction pull ropes that are less inclined to abrade and stretch.

Today, the most common types of pull rope are made from fibers of either polyethylene, polyester, cotton, or a combination thereof. Typically, these ropes are either twisted or braided. In addition, ropes made with a braided plastic outer cover in combination with a polyester core have also been used for pulling cable. As will be seen, however, each of the above materials and rope structures have drawbacks that make the search for a more suitable rope a continuing exercise.

One of the most widely used materials used in producing pull ropes is polyethylene. Generally, polyethylene rope is either single braided or twisted, and is usually is yellow in color. Even though twisted Polyethylene is somewhat more common as a pulling rope, both the twisted and the single braided ropes share the same disadvantages. Included as disadvantages are stiffness which makes it difficult to blow into conduit, high elasticity manifested by excessive stretching; abrasiveness to the point of cutting PVC conduit; high resistance from friction when hot thus increasing tension forces. Finally, polyethylene rope will not hold water that is sometimes required for lubrication during the pull.

Polyester rope is softer and therefore more readily blown into conduit. Moreover, braided polyester rope is less prone to stretch than is polyethylene rope. Never the less, polyester rope has several disadvantages. The most notable is that it is highly resistive, it frays easily, and it wears out quickly.

Finally, a more recent addition to the assortment of pull ropes is rope constructed of a braided plastic outer cover over a braided or twisted polyester core. This type of pull rope has the advantage of low friction and thus low abrasion resulting in little need for lubrication. However, this type of rope also has disadvantages, e.g., it is difficult to splice, it is difficult to tie knots, it is hard to blow in conduit, it does not store easy, and it is very bulky.

In the pulling of fiber optic cable, experience has proven it desirable to divide a long conduit, e.g., 20,000 or more feet, into shorter, e.g., 2000 to 3000 foot lengths, and to place intermediate capstan winches at manholes or access openings at the end of each segment. This arrangement allows long, unbroken fiber optic cables to be pulled into conduit without exceeding the maximum tensile strength and bending radius limits of the cable. It means, however, that the pull rope must be pulled over very long distances over which it is subjected to high abrasion and wear. It also means that the conduit itself, particularly the downstream segments, are subjected to substantial abrasion from pulling tens of thousands of feet of continuous pull rope through it. This factor in pulling fiber optic cable makes the disadvantages of conventional pull ropes more critical in modern fiber optic cable placement methods.

In addition, the use of intermediate capstan winches requires that operators be able to control frictional engagement of the pull rope and cable surfaces with the circumferential surfaces of the winch. By using conventional pull ropes that create higher levels of friction and resistance on such surfaces, an operator could find that engagement and disengagement of the frictional surfaces are difficult to control. Consequently, this could result in too much tension, which in turn could damage the fiber optic cable.

Another consideration is that conventional pull ropes have considerably more frictional resistance against conduit inner surfaces than do fiber optic cables. Because of this, the transition from pull rope to fiber optic cable over an intermediate capstan could be difficult to control by the operator. One way to lessen the effects of this transition would be to use a low friction pull rope, i.e., one with a frictional resistance closer to that of fiber optic cable.

For all of the foregoing reasons, the need remains for a method and apparatus for pulling long runs of fiber optic cable quickly and efficiently while keeping friction and resistance to a minimum.

SUMMARY OF THE INVENTION

An object, therefore, of the present invention is to improve pull ropes used for the pulling of cable through underground conduit.

A second object is to facilitate longer cable pulls.

A third object is to minimize friction on PVC conduit that sometimes results in holes cut through the conduit.

A fourth object is to produce a pull rope that has frictional properties that more closely resemble those of fiber optic cable.

A further object is to minimize friction between the rope and conduit which in turn reduces the winch pulling force required.

The invention uses a pull rope braided of polyester fibers of sufficient tensile strength to pull fiber optic cable through PVC conduit. To reduce surface friction and abrasion of the rope against interfacing surfaces of conduit, the rope is treated by immersion in a water soluble dispersion of fluorocarbon. The treatment leaves a residue of fluorocarbon on the rope. After the rope is immersed in the fluorocarbon dispersion, it is air dried until completely dry. The rope is then ready for use.

In addition to the objects of the present invention, the improved pull rope yields several advantages. One advantage of the present invention is that no lubrication is required for most pulls of the rope. A second advantage is that the fluorocarbon treated pull rope will hold water for cooling. Another advantage of the present invention is an extended service life of the pull rope of at least double that of other pull ropes not treated with a fluorocarbon compound.

At one or more selected intermediate access points spaced along the conduit, a capstan winch is aligned with the conduit for pulling the cable therethrough. The capstan winch has a narrow, large-diameter wheel and is designed and operated to pull the pull rope and cable at a predetermined velocity and tension. A terminal or end pulling winch means, which can include another of the foregoing capstan winch means, is placed at the conduit exit for pulling a pull rope attached to the cable to the exit and preferably directing it out of the conduit to the surface.

With the intermediate capstan winches and the end pulling winch means in place, a pull rope according to the invention is extended in conventional fashion from the conduit entry through the conduit to the conduit exit, passing through each intermediate access point. The rope is connected to the lead end of the fiber optic cable(s) at the conduit entry and to the rope-pulling means at the exit. The rope is then mounted on each capstan wheel and pulled taut. To pull the cables, the capstan winch means and the rope-pulling means are operated simultaneously to pull the cables continuously along their length from the conduit entry through the conduit to the exit at a substantially uniform velocity and at a tension in each conduit segment not exceeding a predetermined amount.

The capstan winches are spaced sufficiently close together along the length of the conduit to limit the tension applied to each length of the cable as it is relayed through the conduit to an amount below its damage threshold. To allow for optimum placement at the access points, each capstan winch is independently driven and controlled. Each capstan winch includes a flanged, narrow-width, large diameter wheel or drum around which the rope and cables wind as they are pulled through the conduit at a predetermined rotational velocity and at a maximum pulling torque. Each wheel is sized to a radius not less than the minimum bending radius of the fiber optic cable.

By pulling the multiple cables with single pull rope, the tension applied to the pull rope can exceed the maximum tensional limits of the individual cables because such tension is distributed approximately uniformly among the cables. The method preferably has each successive downstream winch operating at a pulling rate very slightly slower than the next winch upstream from it. This means that each capstan will continuously slip slightly during pulling. This slippage is enhanced by the low friction of the pull rope and by lubrication of the cables. Thus, the cables are continuously in dynamic, rather than static, frictional engagement with the circumferential surface of each capstan wheel. Not only does this make the pulling very smooth, it assures simultaneously equal frictional engagement of each cable against the capstan wheel and thereby tends to continuously equalize the upstream tension applied to each cable.

The foregoing and other objects, features and advantages of the invention will become more apparent from the following detailed description of a preferred embodiment which proceeds with reference to the accompanying drawings.

BRIEF DESCRIPTION OF THE DRAWINGS

FIG. 8 shows a side view of the method and apparatus used for simultaneous pulling of multiple runs of fiber optic cable into a common conduit with a common pull rope in accordance with the invention of this continuation-in-part, with portions of the capstan wheel flange broken away to show the cable-bridle connections to the pull rope.

FIG. 9 is a top view of the arrangement of FIG. 8 before the cable-bridle connections pass over the capstan wheel, the wraps of the pull rope being shown in single solid lines atop the wheel and in single dash lines below the wheel for clarity.

FIG. 10 is an end view taken along lines 10—10 in FIG. 8 showing the cables wrapped twice around the wheel, as after the bridle connector has passed into the downstream conduit, the wraps of each cable being shown by a broken centerline for clarity.

DETAILED DESCRIPTION

General Arrangement

Figure 1:
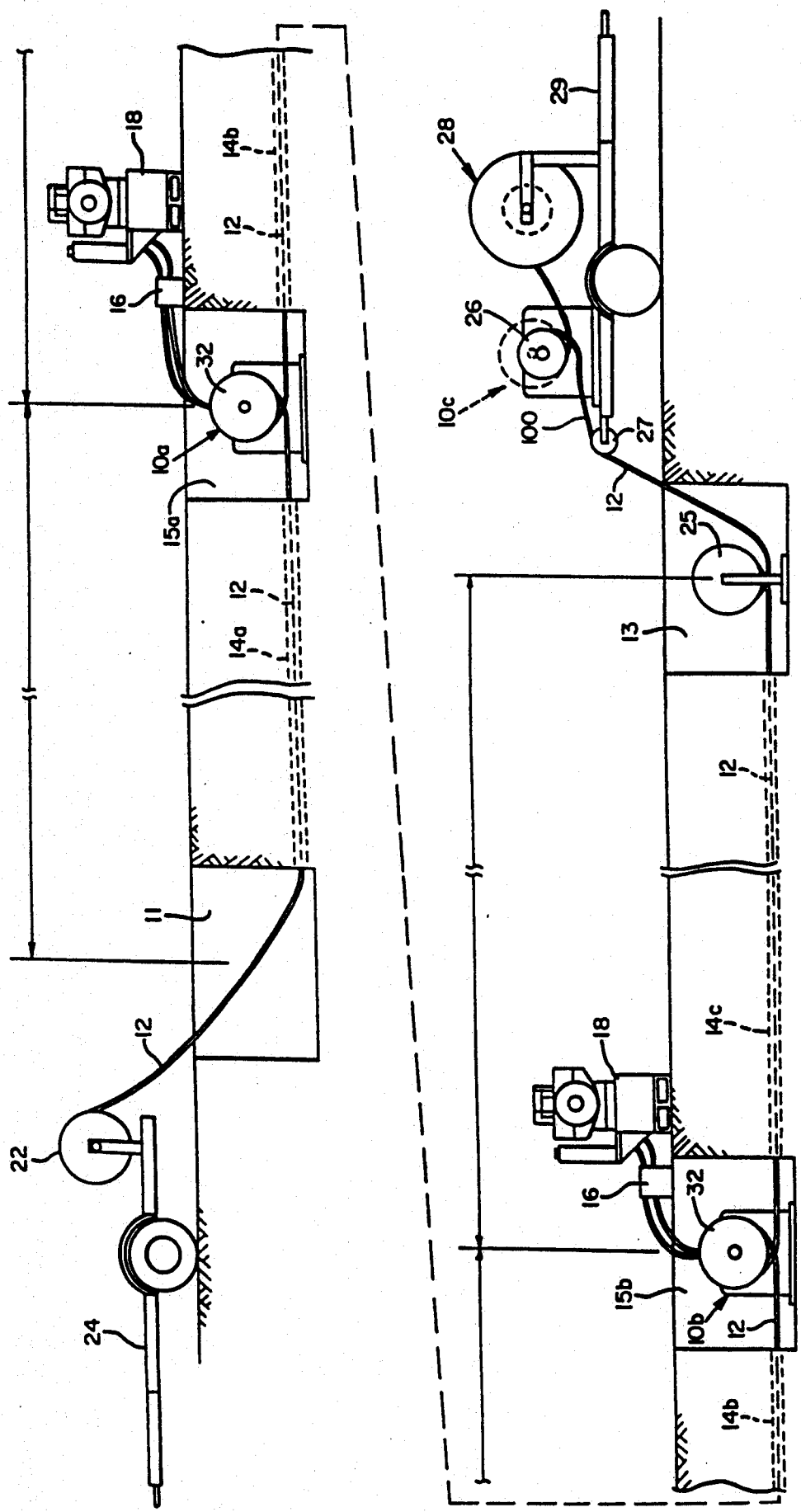
FIG. 1 is a schematic view of a system in accordance with the invention for pulling fiber optic cable through an underground conduit.

Referring to FIG. 1, the invention includes a series of capstan winches 10a, 10b for pulling multiple continuous fiber optic cables 12a, 12b, etc. through an underground conduit 14 from an entry point or manhole 11 to an exit point or manhole 13. Winches 10 are placed within selected intermediate access points or manholes 15a, 15b. The intermediate manholes are spaced closely enough together along segments 14a, 14b, 14c of the conduit that the pulling torque of each winch 10 necessary to pull the cables through each segment is below the tensional damage threshold of the cable. In general, the spacing varies inversely with the frictional resistance of the cable within each conduit segment. Under most conditions, the access points should be spaced about 2,000 feet apart.

The cables 12a, 12b are fed into the conduit 14 from aboveground at the entry manhole 11 and the lead ends are ultimately pulled from the conduit at the exit manhole 13. Storage spools 22 from which each cable is wound are positioned beside entry point 11 on a trailer or truck 24 or other mobile support means. At conduit exit 13, a capstan wheel 32 mounted as a bull wheel 25 or other alignment means is placed within the manhole to relay the pull rope and cables 12a, 12b, etc. upward as it is pulled through and out of the conduit 14 by a conventional rope winch 26 mounted between an idler roller 27 and a take-up reel 28 on a second trailer or truck 29 adjacent the exit point 13. Alternatively, if end portions of the fiber optic cables are to be spooled onto the take-up reel, a capstan winch 10c can be used instead of winch 26c.

Figure 5:
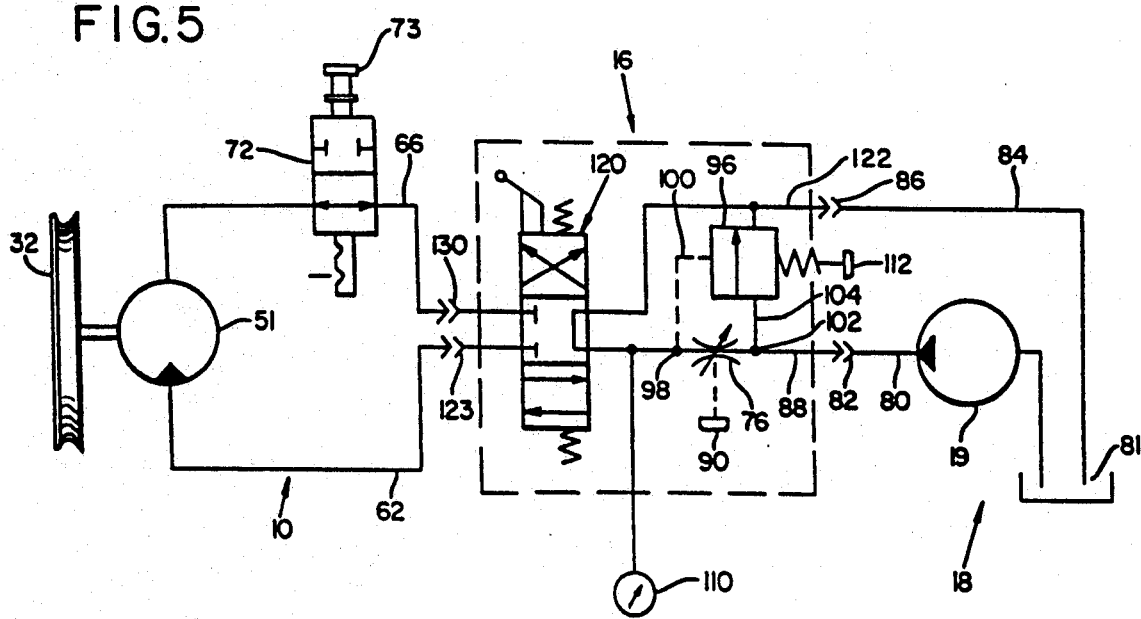
FIG. 5 is a schematic view of the controller, hydraulic pump, and fluid circuit for driving the hydraulic motor of the capstan winch of FIGS. 1 and 4.

Each capstan winch 10 is powered independently to permit their placement at optimally spaced intermediate manholes 15. The winches 10a, 10b are each separately controlled by controllers 16 which operate so as to pull the cable at a substantially uniform velocity through the conduit at up to a predetermined tension set below the tensional limit of the cable. Separate hydraulic power units 18 power each winch 10. Each power unit includes a motor- or engine-driven hydraulic pump 19 (FIG. 5).

Winch 26 pulls the pull rope and the series of winches 10 pulls the pull rope and cables 12a, 12b, etc. at several points along the conduit 14 simultaneously. By pulling sections of cable in this manner, multiple continuous cables of great length can be pulled simultaneously. How the winches operate will be described below.

The Capstan Winch

Figure 2:
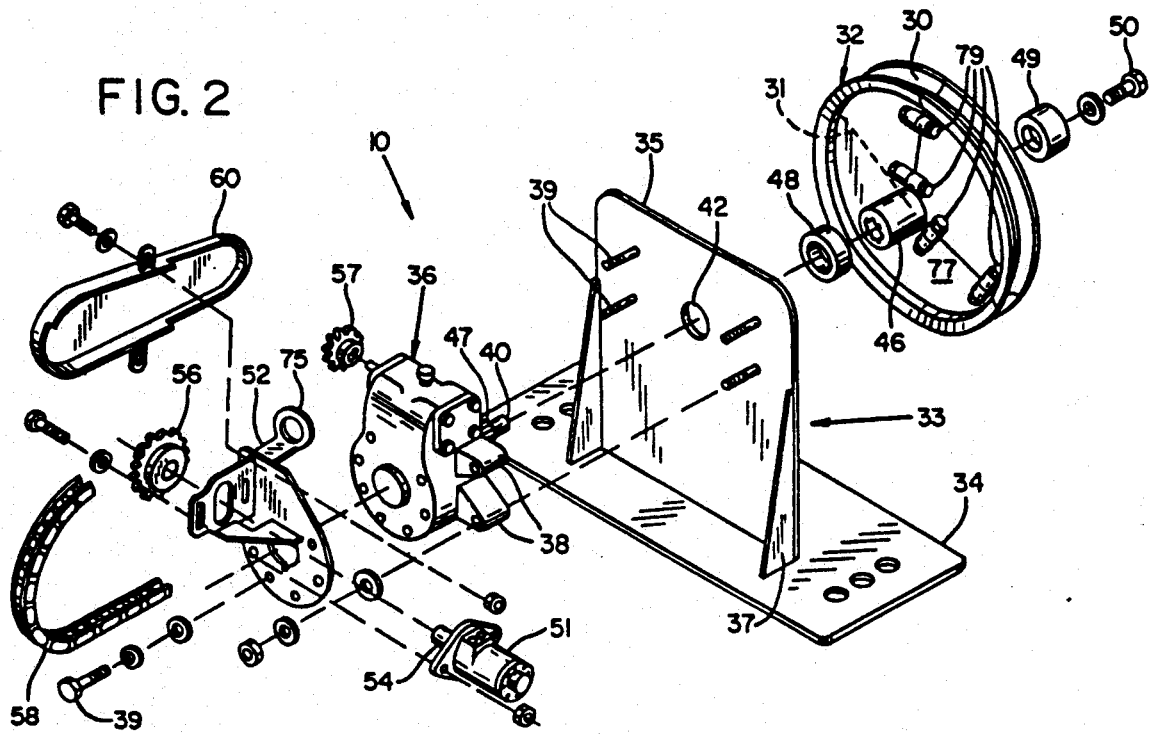
FIG. 2 is an exploded view of a capstan winch used in the system of FIG. 1.
Figure 3:
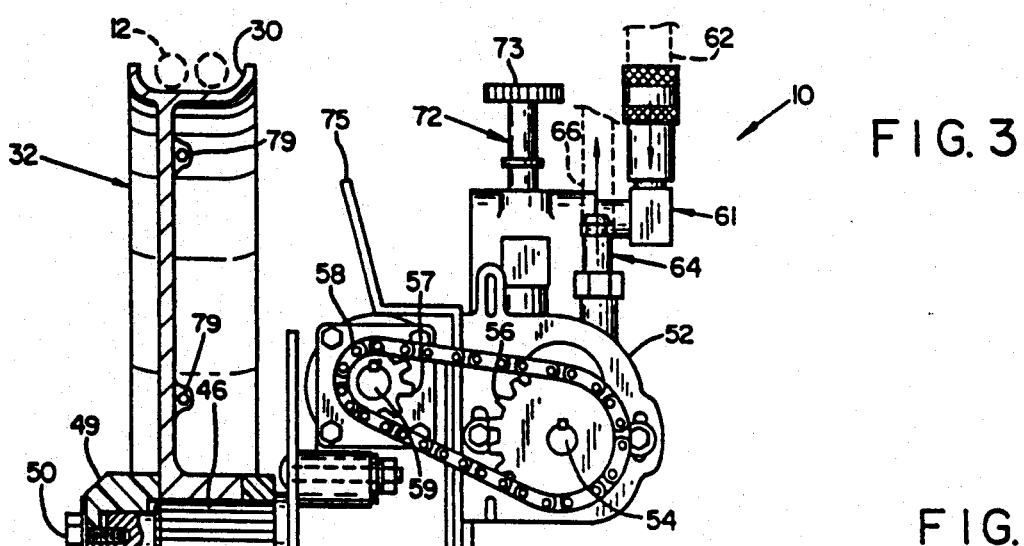
FIG. 3 is a side elevational view of the capstan winch of FIG. 2, with the capstan shown in cross section.
Figure 4:
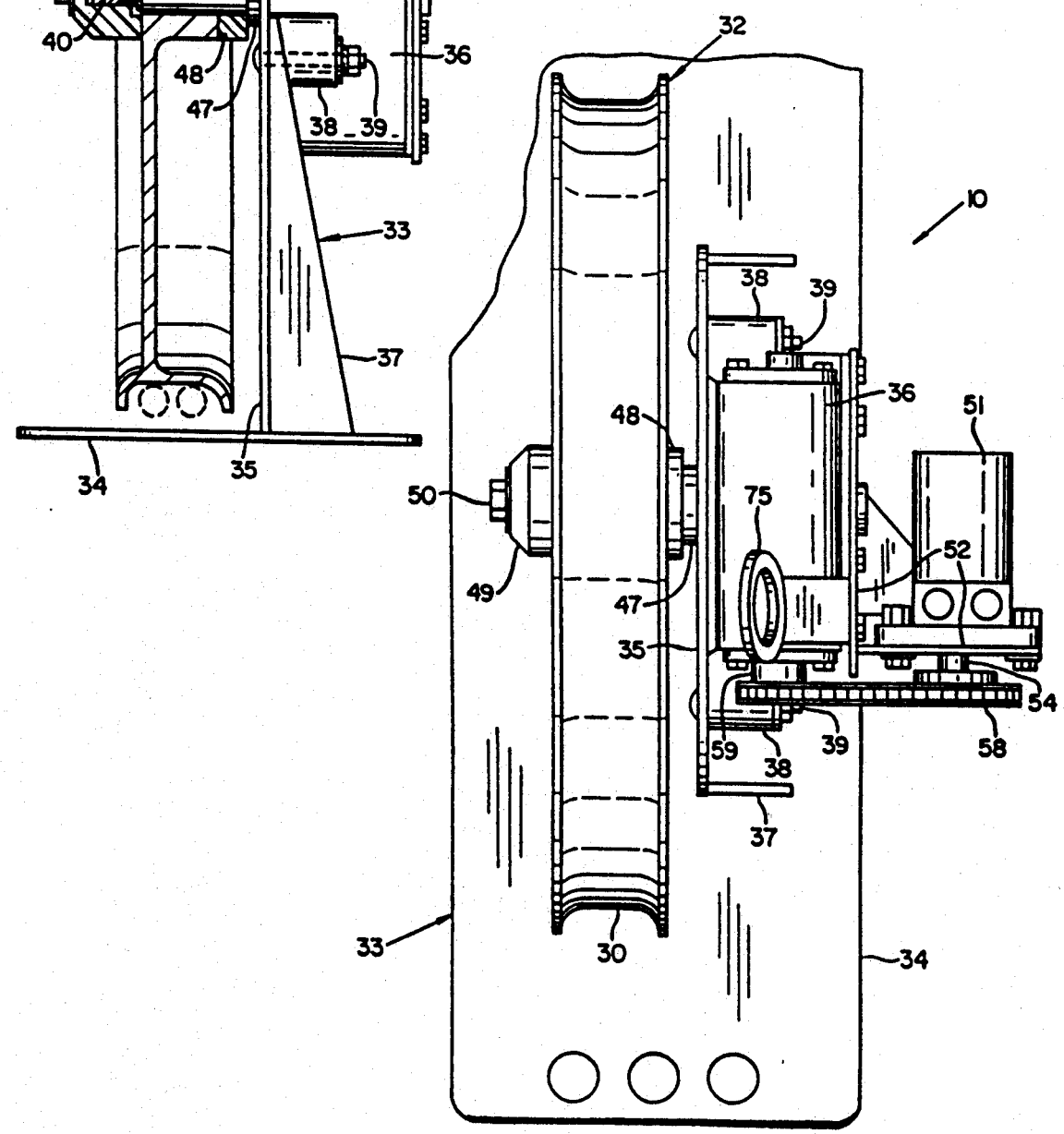
FIG. 4 is a top plan view of the capstan winch.

Referring to FIGS. 2-4, the capstan winch pulls the cable by continuously winding a couple of cable coils on and off the circumferential surface 30 of a narrow, flanged wheel or drum 32 as the wheel turns. The wheel is composed of a strong, lightweight material such as stainless steel or cast aluminum.

The wheel radius 31 is sized to produce a wheel curvature large enough to avoid bending the fiber optic cable beyond its bending limit, normally specified by the cable manufacturer as a minimum bending radius. The bending radius is often given as some multiple of the cable diameter. For example, a one-inch diameter cable having a bending radius of 10 can be wound on a wheel having a radius of at least 10 inches or a diameter of 20 inches. Interchangeable wheels with diameters of 18, 24, 30 and 36 inches are used to capstan cables of various common sizes.

Wheel width is sized to the diameter and number of cables to be pulled with just sufficient margin to allow reversal. In one operative example, for use with two 0.65 inch-diameter cables with two wraps, the inside width of the circumferential surface of wheel 32 between flanges is 3.625 inches. This allows 1.3 inches for each cable (2.6 inches total) and 1 inch space for reversal while maintaining alignment with the conduit.

A winch bracket 33 supports the wheel 32 so that it may turn in the desired manner. The winch bracket 33 includes a bracket base plate 34 to which a perpendicular upright plate 35 is welded and braced by gussets 37. A gearbox 36 is connected via mounting ears 38 and bolts 39 to the plate 35. Within the gearbox is a reducer gear train which drives a splined output shaft 40. The shaft extends through an aperture 42 in the plate 35 into an internally splined hub 46 of the wheel 32. The wheel is thus rotationally mounted to the shaft 40. An annular spacer 48 is fitted onto the shaft 40 between the hub 46 and a shoulder 47 of the shaft 40. The wheel is secured to the shaft 40 by an end cap 49 through which a threaded cap screw 50 extends axially into the shaft. Both spacer 48 and cap 49 are formed of a resilient, durable material such as nylon.

Corresponding to each wheel diameter is a different bracket 33, each having an upright plate 35 of a different height to maintain sufficient spacing between the wheel and the bracket base 34 for the cable to pass. Each bracket is sized to accommodate a different sized wheel yet maintain the lower rim of wheel 32 a predetermined distance from bracket base 34. Changing wheel size requires unbolting bolts 39 from ears 38 on gearbox 36 and removing wheel 32 by removing screw 50 and end cap 49. The procedure is reversed after insertion of the new bracket and wheel. Alternatively, a single bracket with several vertically spaced holes for adjustably mounting the gearbox 36 can be used with different diameter wheels. As a further alternative, each capstan can be mounted on a boom as disclosed in my U.S. Pat. No. 4,757,976.

The gearbox 36 and in turn the wheel 32 are driven by a high-speed, low-torque hydraulic motor 51 adjustably mounted on secondary bracket 52 bolted to a side of a gearbox 36 opposite the shaft 40. Bracket 52 is generally L-shaped in top view (FIG. 4) for mounting motor 51 with its output shaft 54 normal to gearbox output shaft 40. A sprocket 56 keyed to shaft 54 is aligned with a sprocket 57 keyed to a gearbox input shaft 59 extending from the side of the gearbox 36 and parallel to shaft 54. The two sprockets are operably connected by a chain 58, all enclosed within a protective housing 60, to transfer the power of the motor to the gearbox.

To maintain the desired pulling torque on the cables 12, the rotation rate of the wheel 32 is adjusted with respect to its diameter. Typically, it is desired that the wheel pull the cable between 45 and 200 feet per minute, depending upon the conduit resistance which must be overcome. If a larger diameter wheel is installed, sprockets 56, 57 are changed to reduce the wheel's rotation rate. Conversely, different sized sprockets are installed to increase the rotation rate for a smaller diameter wheel.

Figure 7:
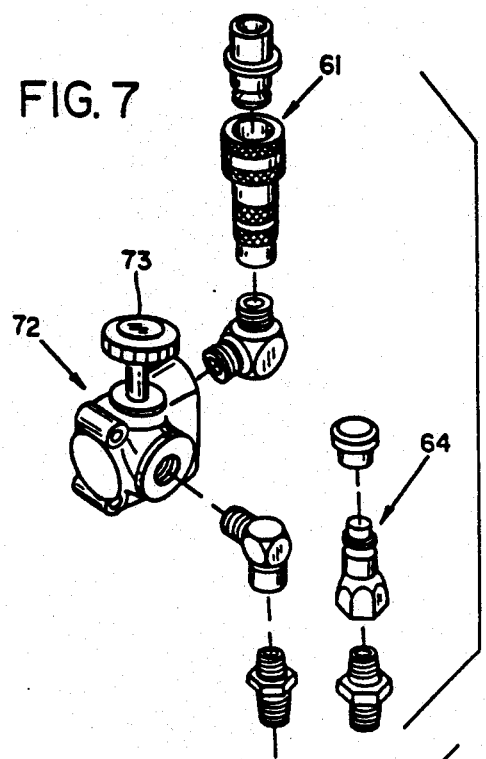
FIG. 7 is an exploded view of a cutoff valve and fittings for delivering fluid to the hydraulic motor in the circuit of FIG. 5.

Referring to FIGS. 3 and 7, the hydraulic motor 51 has a female connector 61 and a male connector 64. The motor is connected thereby into the hydraulic drive circuit of FIG. 5 to receive hydraulic fluid from line 62 and to return the fluid to line 66. To shut off the flow of fluid to the motor 51, a two-position shutoff valve 72 is mounted atop the motor, shown in relation to the connectors 60, 64 in FIG. 3 and in the exploded view of FIG. 7. A plunger 73 of valve 72 is pushed down to block the flow of hydraulic fluid through line 66 to the motor and thereby stop the winch 10 from operating.

Atop motor bracket 52 is a lifting eye 75 for lifting the winch 10 into and out of the intermediate access points 15 (FIG. 1). Often these access points will be existing manholes having a diameter less than the diameter of the larger wheels used for pulling thicker fiber optic cable. To overcome this barrier, the wheel 32 can be cast with a removable pie-shaped wedge 77, shown in FIGS. 2 and 3, which is removed when the winch is put into or taken out of a manhole and then reattached by means such as bolts 79.

The Capstan Drive Arrangement

The capstan drive arrangement controls the pulling torque and rate of rotation of the capstan winch. FIG. 5 shows a schematic view of the capstan drive arrangement. It includes the hydraulic pump 19 which delivers hydraulic fluid under constant pressure and the controller 16 which controls the pressure and rate of flow of the fluid to the capstan winch.

Controller 16 appears in the center of the schematic (outlined in dotted lines) with the power unit 18 including hydraulic pump 19 and tank 81 depicted on the right and the capstan winch drive motor 51 of winch 10 shown on the left.

Referring to the pump 19, an output or high pressure line 80 connects the pump to inlet port 82 of the controller 16. The pressurized fluid is pumped through line 80 and into the controller at this port. A return line 84 connects to outlet port 86 of the controller to return fluid to the tank. Pump 19 is driven by conventional means (not shown).

Figure 6:
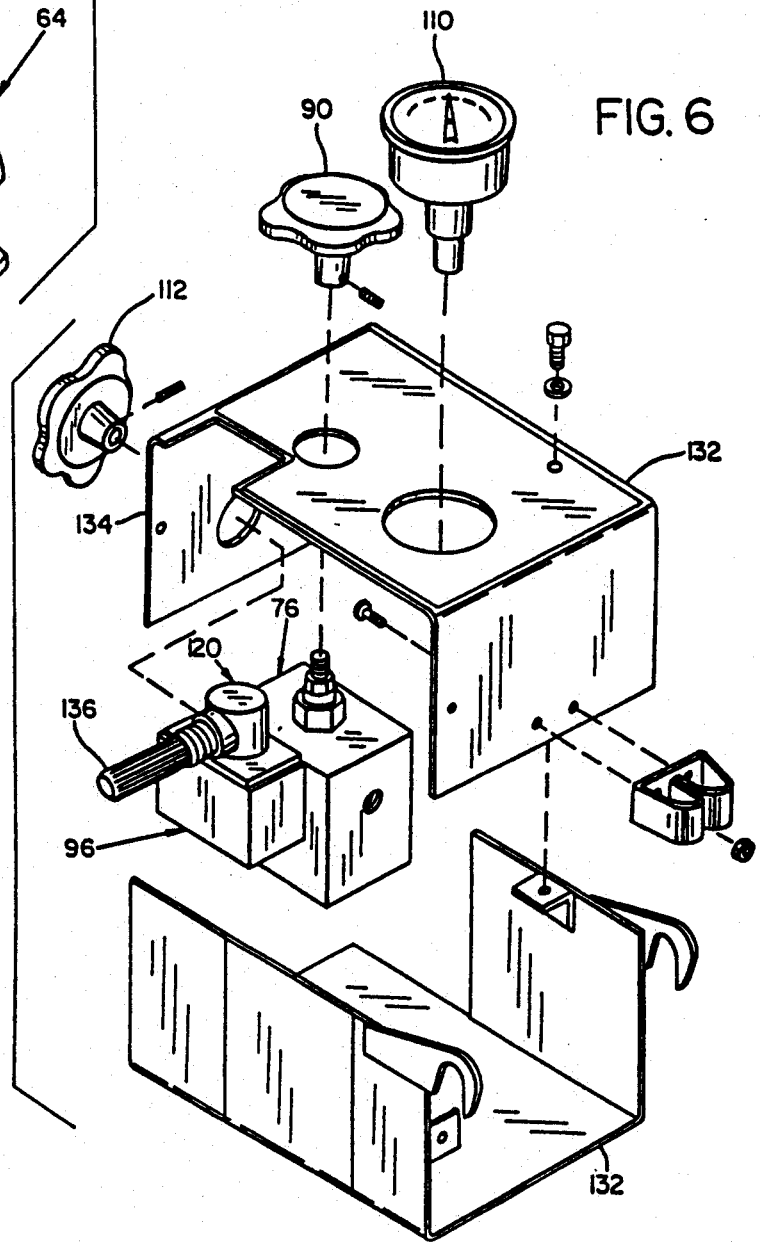
FIG. 6 is an exploded view of the capstan winch controller of FIG. 5.

Within the controller are several adjustable valves to regulate the flow speed and pressure of the hydraulic fluid to the capstan winch. Referring to FIGS. 5 and 6, the controller includes a speed control valve 76 which is adjustable to limit the flow of hydraulic fluid from the pump 19 to the motor 10. Valve 76 is positioned along internal line 88 which connects to inlet port 82. By adjusting handle 90, the operator can constrict or expand the throat of the valve and thereby control the flow of hydraulic fluid through line 88. The flow determines the rate at which wheel 32 rotates and hence the velocity at which the cable moves through the conduit.

To control the pressure of the fluid flow through valve 76 to the winch 10, a pressure control valve 96 selectively shunts a portion of the fluid back to the tank 81. Valve 96 connects to line 88 at a node 98 between valve 76 and the winch via check line 100. Through line 100, the pressure of the fluid delivered to the winch is also brought to bear on valve 96. When that pressure exceeds the adjusted bias on valve 96, the valve opens to shunt the fluid upstream of flow control valve 76 through a shunt line 104 connected to line 88 at a node 102. In this manner, less fluid is forced through valve 76 and the pressure of the fluid pumped to the winch 10 drops. The lower pressure and fluid flow to motor 51 decrease the pulling torque and speed, respectively, of the winch 10.

The pressure of the fluid in line 88 is measured (in pounds of pull) by a gauge 110. By monitoring the gauge, the operator can adjust the maximum pressure of the fluid powering the winch by turning a handle 112 on the pressure control valve 96 to cause the valve to open at the desired pressure and thereby limit the pulling torque of the winch to a tension below the damage threshold of the cable 12.

The controller also includes a manual three-position directional valve 120 for controlling the direction of the fluid flow into the winch 10 and for shutting off the flow entirely. In the neutral position shown in FIG. 5, fluid in line 88 is routed through valve 120 into return line 122 which connects to the outlet port 86. With the valve 120 shifted to its lower setting indicated by parallel arrows, the fluid flows through it and a port 123 in a forward direction to the winch motor 51 via connecting line 62. The fluid returns to the controller from the winch motor through line 66 to a port 130. From the port 130, the fluid flows through the valve 120 to internal return line 122. When shifted to its upper setting indicated by crossed arrows, the valve 120 directs the fluid in line 88 into line 66 to flow the opposite way through the winch motor and back to the controller through line 62 to return line 122. The change in flow direction changes the direction of rotation of wheel 32 and hence the direction of cable pull.

The shutoff valve 72 is located in line 66 between the winch motor 51 and port 130. The valve 72 on the winch motor and valve 120 on the controller allow the winch to be stopped at two different locations, that is, either at the power unit or in the manhole.

FIG. 6 shows a specific embodiment of the controller. Valve 76 is controlled by knob 90 from the top of enclosure 132. Gauge 110 is also located atop the enclosure for easy viewing. Pressure control valve 96 is accessible by its knob 112 extending from a side 134 of the enclosure. Directional valve 120 is controlled from the front of the enclosure by a lever 136.

Operation

Referring to FIG. 1, the capstan winches 10a, 10b (and any number of additional winches as needed) are placed at appropriate access points 15 along the conduit 14 spaced such that the tension necessary to pull the cable does not exceed the cable's tensional limit. The spacing varies with the acceptable pulling tension on the particular cable, normally specified by the cable manufacturer and typically around 600 pounds. The winches are positioned to pull at up to a predetermined maximum tension well below the limit for single cable, preferably in a steady state pulling tension range of 300-450 pounds for 600 pound cable, to assure an adequate margin of safety. The distance chosen between the access points 15a, 15b depends in large part on the cable drag, which varies with the surface and linearity of the conduit. In practice, the capstan winches 10a, 10b have been placed more than 2,000 feet apart without the pulling tension reaching the cable tension limit.

To begin, each capstan winch 10 is lowered into the appropriate access point with the selected wheel oriented in the direction of cable pull. To pull the cable through a straight portion of the conduit, the wheel is oriented vertically, tangentially aligned with the conduit, as shown in the drawings. However, by shifting the bracket 33, the wheel 32 can be oriented at any angle to pull the cable around a bend in the conduit. If a wheel with diameter larger than the diameter of the access point 15 is required, wedge 77 is removed and reattached once the winch is positioned within the manhole.

The pull begins by passing a pull rope, tape or wire 100 through each segment of conduit 14 from the entrance 24 to the exit 25. An end of the pull rope is connected to a lead end of cables 12a, 12b, etc. at the storage spool 22. The pull rope is wound several times around wheel 32 at each winch 10 and around bull wheel 25 and pulled taut.

The pull rope 100 is connected to the lead ends of the cables by means of a multiple-connector bridle 130 as shown in FIGS. 8 and 9. Two cables 12a, 12b are shown but the invention can be extended to include one or more additional cables 12c. The following discussion assumes two cables are pulled together. The bridle includes a swivel 145. The swivel has a clevis at each end. The pull rope is connected to the clevis at one end. An eye is connected to the clevis at the other end and has a tubular member into which several short steel cables 155 are swaged. Connected to each cable 155 is a Kellem 140. A Kellem is a braided mesh pulling grip known in the art. The lead end of each fiber optic cable is inserted into each Kellem. The cables 155 are of different lengths so the Kellems 140 are staggered longitudinally for ease of passage through the conduit and over the capstan wheels.

The cable must be pulled from downstream with sufficient tension that it frictionally engages the circumferential surface 30 of the preceding or upstream capstan wheel 32. If the tension on the cable at the point where it leaves the preceding winch 10a is too low, that wheel 32a will spin beneath the cable windings. To assure that the cable is sufficiently taut to frictionally engage the upstream winch drums, but to avoid stacking of pulling tensions, the speed of the following winch 10b should be slightly less than that of the preceding winch or winches. In practice, the last downstream winch 10b is preferably set to pull slower than the upstream winches, so that the cable on each winch slips slightly. The cables are conventionally lubricated, e.g., with POLYWATER F cable lubricant, for easy passage through the conduit. This lubrication also helps assure that both cables engage the wheel surface under substantially equal dynamic frictional force.

Before the actual cable pull begins, each winch is set by its respective controller 16 to pull the rope and attached cable 12 at a substantially uniform velocity and at a pulling tension within the predetermined tensional limit of the cable. This is done through the following steps. First, valve 72 is closed to shut off the flow of fluid to the winch 10. Second, valve 76 is opened fully. Third, pressure control valve 96 is adjusted to open fully against any pressure. Fourth, directional valve 120 is shifted to either the forward or reverse flow direction to block the return flow to the pump through line 122.

The fluid then bears against valve 96 through line 100 and the flow is shunted through line 104. Valve 96 is then adjusted to increase the bias necessary to open the valve until the necessary pressure rises to the desired maximum pulling pressure. This can be read from gauge 110. For multiple cables, this limit can be increased. For 600 pound maximum cables, the tension setting can safely be set to a product of the number of cables times the maximum steady state pulling tension, for example, 2×450=900 pounds for two cables having a 600 pound maximum tension.

Valve 72 is then opened to operate winch 10. To adjust the rate of rotation of the wheel 32 of the winch, valve 76 is adjusted to regulate the rate of fluid flow to the winch.

With operators at each winch and at the conduit entrance and exit in communication with each other, the winches are started. The pull rope is pulled through the conduit and taken up on the power take-up reel 28 which also provides tension to winch 26 or 10c. The cables, following the rope, are pulled off the spool 22, down and through the conduit entry 11. Within the conduit 14, the cables are relayed by winch 10a to winch 10b to the conduit exit 13 and pulled out of the conduit by winch 26 or 10c.

As the bridle 130 approaches the first capstan wheel, care must be taken to avoid twisting of the cables. As the bridle emerges from the upstream conduit, a splitter 150 is placed between the cables, as shown in FIGS. 8 and 9. The bridle and lead ends of the cable are guided so that the first Kellem contacts one of the capstan wheel flanges and the second Kellem lays beside the first one on the capstan wheel circumferential surface so that the fiber optic cables do not overlap. Typically, in this configuration, two wraps of the pull rope are used, causing two wraps of each cable 12a, 12b to wind around the wheel. The foregoing procedure positions the second wrap of the first cable 12a between the first and second wraps of the second cable 12b, without the cables overlapping, as shown in FIG. 10. Lubricating the cables helps keep the wraps from riding up over one another. Continuing to pull, the bridle and cables feed into the next downstream segment of conduit. Preferably, a splitter is also placed on the downstream side of the capstan wheel. This procedure is repeated at each succeeding capstan wheel.

Sometimes, when cables are pulled around a bend (e.g., 90' radius), a twist can develop in the fiber optic cables. If a twist appears at one splitter, it must not be passed over the capstan wheel. If necessary to clear the twist, all of the capstans must be stopped and reversed briefly to pull about three feet of cable back to the capstan where the twist appeared. Before reversal, a splitter should be placed between the cables on the downstream side of the capstans, if not placed there initially. Upon reversal, the cables spiral laterally across the width of the circumferential surface of the capstan wheel to the opposite flange. The width of such surface is preferably limited to the space actually needed by the cable wraps with a small added margin for the bridle connector. This affords the cable wraps minimal opportunity to ride over one another before abutting the opposite flange. After backing up, both cables are unwound from the capstan wheel and the twist is passed forward into the downstream conduit. Then, the cables 12a, 12b are wound back onto the capstan wheel and the pull can be resumed.

The winches self-regulate their rate of wheel rotation and torque on the cable to maintain the predetermined velocity and pulling tension within limits. If a following or downstream winch 10b is pulling at a slower rate than the preceding winch 10a, slack will develop in the cable 12. Eventually, as the cable loosens its frictional engagement with the surface 30 of the preceding winch 10a, winch 10a ceases pulling the cable, although it continues turning the wheel 32. The slack is then picked up by the following winch 10b, which is still pulling, until the coil of cable tightens onto the wheel of the preceding winch 10a so that frictional contact is again made.

On the other hand, if winch 10b is pulling at a rate significantly greater than the winch 10a, tension on the cable increases at winch 10b as the cable tautens. Upon reaching the preset pressure limit, winch 10b stops pulling so as not to damage the cable 12. As more cable is provided by winch 10a, the tension on the cable slackens and winch 10b will once again pull the cable. A workman observing this action can adjust the controller of winch 10b so that its pulling speed nearly matches that of upstream winch 10a. Ideally, such speed is set to slightly less than that of the upstream winch so that the cables continuously slip slightly on the capstan wheel, and thereby maintain constant dynamic frictional engagement therewith during pulling.

This self-regulation is facilitated by the operation of the controller 16. As the cable resistance in the conduit rises, a greater amount of fluid pressure is required to overcome it and turn the wheel 32. The resistance of the wheel 32 increases relative to the resistance of the speed control valve 76, causing the constant hydraulic pressure within the capstan drive arrangement to increase across the capstan winch 10 and decrease across the valve 76. The increased resistance overall decreases the flow rate and rotation rate of the wheel. When the pressure rises across the winch 10 to the bias setting of valve 96, the valve opens to shunt fluid away from the winch motor 51, effectively limiting the pressure to that setting. The winch 10 still turns but at the slower rate, stopping if the cable resistance increases further. If the cable resistance decreases because slack develops upstream, the fluid pressure across the winch decreases and valve 96 closes. The winch 10 then turns at a faster rate as the fluid flow rate increases through motor 51.

With this embodiment of the present invention, two continuous runs of fiber optic cable have been laid simultaneously in a common conduit without damage, and without interduct.

In the embodiment illustrated, the cables are pulled until they reach the surface of the exit 13 and before they wind around the conventional winch 26. But the method is not so limited. Alternatively, another capstan winch 10c could be mounted in place of the conventional winch 26 and act in combination with the bull wheel 25 to pull the cables out of the conduit and wind them onto an appropriately-sized take-up reel 28. This may be useful, for example, if an end portion of each cable is to be relayed into a tall building. Storing an end portion of pulled cable on the reel 28 avoids the need for a splice at the conduit exit.

Low-Friction Pulling Rope

Figure 11A:
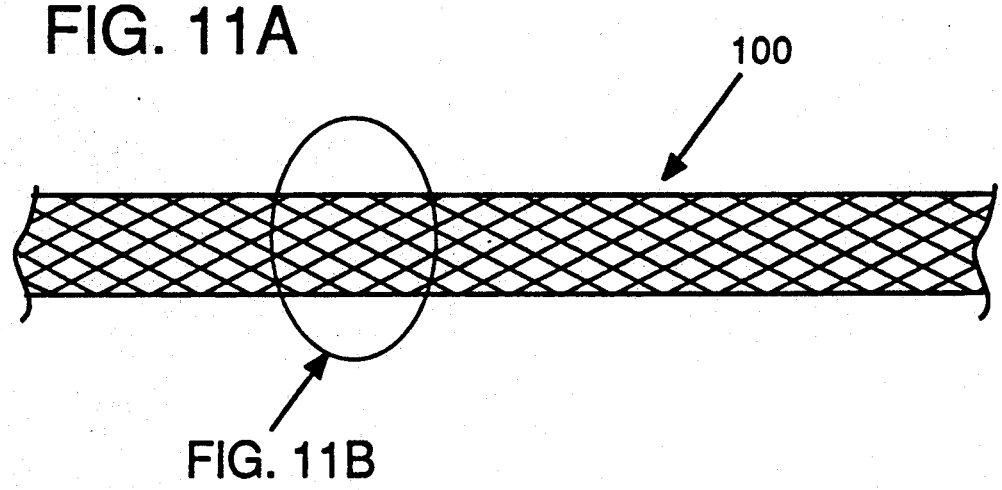
FIGS. 11A and 11B are side views of the polyester pull rope, shaded to indicate the Fluorocarbon coating.
Figure 11B:
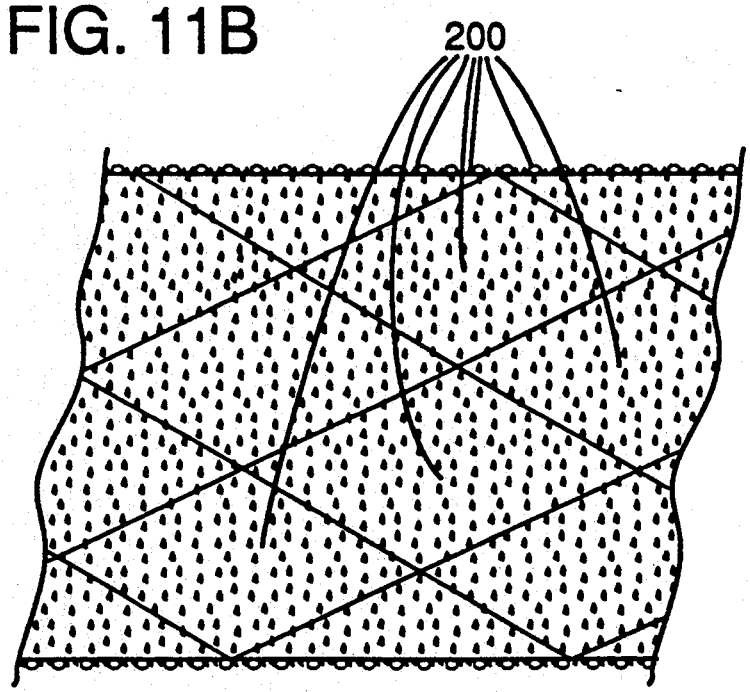

A section of rope 100 of the present invention is shown in FIG. 11A. The rope is braided of polyester fibers of sufficient tensile strength to pull fiber optic cable through PVC conduit e.g. 2000 lb. tensile strength, suitably of ⅛ to ⅜ inch diameter. To reduce surface friction and abrasion of the rope against interfacing surfaces of conduit, the rope is treated by immersion in a water soluble dispersion of fluorocarbon. The dispersion is preferably Fluon brand, distributed by ICI Advanced Materials Inc. A similar dispersion of Teflon brand (available from DuPont) will also siffice FIG. 11B is a magnified side view of the rope after treatment. The treatment leaves a residue 200 of fluorocarbon on the rope. After the rope is immersed in the fluorocarbon dispersion, it is air dried under normal atmospheric conditions (e.g. 70 F.) until completely dry. The rope is then ready for use, as above-described.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for installing fiber optic cable in a conduit having an entry at one end and an exit at an opposite end, the method comprising:
    placing an end pulling winch at the conduit exit, for pulling the cable through the conduit;
    providing a pull rope composed of a plurality of polyester fibers;
    extending said pull rope from the conduit entry through the conduit to the conduit exit; and
    connecting one end of said pull rope to the lead end of the fiber optic cable and an opposite end thereof to the end pulling winch;
    the polyester pull rope being treated in a fluorocarbon dispersion so that the fibers of polyester are coated with fluorocarbon on at least an outer surface of the pull rope to produce a low-friction interface between an inner surface of the conduit and an outer surface of the pull rope during a pull;
    providing at least one intermediate access point spaced between the entrance and exit to divide the length of the conduit into segments;
    placing an intermediate capstan winch at each intermediate access point for pulling the cable through each segment of the conduit, the capstan winch including a flanged capstan wheel having a circumferential cable engagement surface;
    extending the polyester pull rope from the conduit entry through the conduit via the intermediate access point to the conduit exit;
    winding at least one wrap of an intermediate portion of the pull rope around the capstan wheel at the intermediate access point; and
    simultaneously operating each winch to pull the rope and thereby the cable through the conduit, the low friction interface produced by the fluorocarbon coating on the polyester pull rope serving to minimize abrasion to the pull rope and to the conduit.

2. A method according to claim 1 including setting each successive winch proceeding in a downstream direction to pull at a rate of pull slightly less than the rate of pull of the immediately preceding upstream capstan winch so that the pull ropes and cables are in dynamic frictional engagement with the circumferential surface of the capstan wheel, the fluorocarbon coated surface of the pull rope serving to reduce the static coefficient of friction between the outer surface of the pull rope and the cable engagement surface of the capstan wheel.

3. A method according to claim 1 in which multiple long runs of fiber optic cable in a common conduit are pulled by connecting one end of the pull rope to a lead end of each of the fiber optic cables.

4. A method according to claim 1 in which multiple long runs of fiber optic cable in a common conduit are pulled by connecting one end of the pull rope to a lead end of each of the fiber optic cables.

5. A method according to claim 1 in which the conduit is made of polyvinyl chloride.

6. A method according to claim 1 in which the conduit is made of plastic material.

* * * * *